United States Patent
Yalamanchi et al.

(10) Patent No.: US 8,521,614 B1
(45) Date of Patent: Aug. 27, 2013

(54) METADATA-DRIVEN MERCHANT FEED PROCESSING SYSTEM

(75) Inventors: Aravind Yalamanchi, Lynnwood, WA (US); Francois M. Rouaix, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 2 days.

(21) Appl. No.: 12/856,917

(22) Filed: Aug. 16, 2010

(51) Int. Cl.
*G06Q 30/00* (2012.01)
(52) U.S. Cl.
USPC ........................................................ 705/27.1
(58) Field of Classification Search
USPC .................................................. 705/26–27.2
See application file for complete search history.

(56) References Cited

U.S. PATENT DOCUMENTS

| | | | |
|---|---|---|---|
| 2005/0138078 A1* | 6/2005 | Christenson et al. | 707/104.1 |
| 2006/0212494 A1* | 9/2006 | Ito | 707/203 |
| 2010/0057806 A1* | 3/2010 | Neal et al. | 707/740 |

OTHER PUBLICATIONS

"Informa Investment Solutions, Inc. Announces Performer Enterprise" (Business Wire, Feb. 10, 2005).*

U.S. Official Action dated Nov. 18, 2011 in U.S. Appl. No. 12/856,945, filed Aug. 16, 2010, first named inventor Aravind Yalamanchi.
U.S. Official Action dated May 8, 2012 in U.S. Appl. No. 12/856,945, filed Aug. 16, 2010, first named inventor Aravind Yalamanchi.
U.S. Notice of Allowance/Allowability dated May 16, 2013 in U.S. Appl. No. 12/856,945, filed Aug. 16, 2010, first named inventor Aravind Yalamanchi.

* cited by examiner

*Primary Examiner* — Jeffrey A Smith
*Assistant Examiner* — Ethan D Civan
(74) *Attorney, Agent, or Firm* — Hope Baldauff, LLC (57) ABSTRACT

A metadata-driven merchant feed processing system is described herein. A merchant providing an online marketplace for the sale of items by a variety of sellers implements a feed processing mechanism driven by feed metadata. The feed metadata consists of declarative metadata statements that model the semantics for transforming seller-facing feed data describing the seller's items to customer-facing listings data to be loaded to an item catalog. The feed metadata captures differences between different versions of the item catalog by maintaining the semantics of the product categories and attributes of the item catalog as of a certain version. Similarly, semantics in the feed metadata modeling new product categories and/or attributes are utilized to support supplemental feeds from sellers to support new features and improvements in the item catalog. The metadata driven feed processing system also provides support for multiple types of seller-facing data entities and feed formats through metadata mapping.

32 Claims, 6 Drawing Sheets

METADATA-DRIVEN MERCHANT FEED PROCESSING SYSTEM

BACKGROUND

A merchant may provide an online marketplace for the purchase of a variety of items by customers online or over the telephone. Such items may include products that are shipped directly to the customer, media that is downloaded by the customer, and services made available to the customer over the Internet. The items may be made available for sale by a number of sellers, with multiple sellers offering the same item. The sellers may provide to the merchant's system the details required to list the items through the online marketplace. Such item details may include an identification of the item, such as a stock keeping unit ("SKU"); a title or description of the item; technical specifications for the item; the purchase price; item availability, such as whether the item is "in stock;" shipping parameters and costs; the geographic region in which the item is available to customers; the locale of the seller's fulfillment center; and the like. The merchant system may consolidate the details regarding a particular item provided by the various sellers by matching item identifying information, such as an item SKU, item title, and/or item description. The consolidated item details may then be placed in an item catalog and made available online for searching and browsing by customers wishing to purchase the corresponding items from the sellers.

The type of item details that may be provided by the sellers to the merchant system may be driven by the format and capabilities of the merchant's item catalog. For example, the item catalog may group items by product type or category, such as "Memory Cards" or "Batteries." This may allow customers to browse and/or search the product categories to locate items they wish to purchase. In addition, the merchant's item catalog may include specific attributes for a particular product category, such as "capacity" for memory cards or "package_quantity" for packs of batteries. Customers may rely on these attributes when searching the online item catalog to locate the items they desire. When a particular item is chosen from the item catalog by a customer, the details of the item may be presented to the customer based on the product category of the item, along with a list of the sellers offering the item, their corresponding purchase price and product availability, and a "buy button" or other mechanism for purchasing the item from the seller. Each seller is therefore benefited by providing values for as many attributes in the item catalog as possible, in order to ensure that the seller is included in the list of sellers once an item is located by the customer.

The merchant system may provide a mechanism by which the seller may periodically send the item details to the system for update of the item catalog. Some item details, such as the item SKU or item description, may be relatively static with the values seldom changing. Other item details, such as price and availability, may change on a regular basis and may require frequent updating by the seller. Because of the frequency of change of many item details, a seller may implement an automated integration process that accesses attributes of the item within the seller's internal systems, constructs data feeds containing the item details, and transmits the feed data to the merchant system for update of the item catalog. Such an integration process may require a considerable effort and cost on the part of the seller to establish and maintain.

The merchant may periodically enhance or improve the item catalog by adding new product categories, new item attributes, and/or new capabilities or features. For example, the item catalog may include a product category for alcoholic beverages. Items belonging to this product category may contain an attribute that specifies the type of alcoholic beverage of the item, such as beer, wine, liquor, and the like. In an effort to improve the quality of the customer experience, the merchant may expand the product categories to include new categories for each of the separate types of alcoholic beverage. In addition, the merchant may add additional attributes for these new product categories that are specific to each. For example under the new product category for wine, the merchant may add an attribute for the bottle aging time of the wine or the variety of the grape. Further, the merchant may add to some or all of the existing product categories the capability for the seller to offer promotional pricing, such as a 15% discount on orders totaling over a specific value.

Implementing such enhancements and improvements in the catalog may cause issues for existing sellers, however. For example, if the merchant were to remove the alcoholic beverage product category from the item catalog in favor of the newly established product categories for the various types of alcoholic beverages, the integration processes established by some existing sellers may no longer function. This could result in a significant amount of time and money being required for these sellers to implement new integration processes for the new product categories or the merchant to provide backward compatibility with the existing integration processes. Even if the now deprecated alcoholic beverage product category is retained, customers searching and browsing for wine utilizing the new product categories or the new attributes may not locate items offered by the existing sellers that are integrated with the older product category.

In addition, in order for a seller to benefit from the new enhancements and improvements to the item catalog, the seller must be able to provide additional item details to the merchant system to support the new product categories, attributes, and features. However, if the seller has already invested a significant amount in developing integration processes for the older product categories, attributes, and features, reintegration with the new item catalog may prove too costly. This may result in the merchant system having to support a wide variety of integration processes for the various sellers depending on the product categories, attributes, and features available in the item catalog at the time of integration.

It is with respect to these and other considerations that the disclosure made herein is presented.

DETAILED DESCRIPTION

The following detailed description is directed to a metadata-driven merchant feed processing system. Utilizing the technologies described herein, a merchant providing an online marketplace for the sale of items by a variety of sellers may implement a feed processing mechanism having the flexibility to allow enhancements and improvements to an online catalog of items to be made while limiting the impact on existing integration processes implemented by the sellers. The metadata-driven feed processing system may also allow sellers to more easily take advantage of new product categories, attributes, and features added to the item catalog. According to embodiments, the feed processing system is driven by feed metadata maintained in the merchant system. The feed metadata consists of declarative metadata statements that capture the semantics for transforming seller-facing feed data describing items offered for sale by a seller to customer-facing listings data to be loaded to the item catalog.

The feed metadata provides a model of seller-facing product categories, their attributes, and value constraints in a declarative form. The feed metadata drives the feed processing logic by providing semantics for normalizing seller feed data, validating the normalized feed data, and mapping the seller-facing product categories, attributes, and other data entities to associated entities supported by the item catalog. The feed metadata also captures the differences between different versions of the item catalog, referred to herein as "release packages," by maintaining the semantics of the product categories, attributes, and features of the item catalog as of a certain version or time. If enhancements or improvements are made to the item catalog, semantics are added to the feed data to support any new product categories, attributes, and/or features, while the feed metadata supporting earlier release packages may be modified to allow existing seller-facing data entities to be mapped to the new product categories and attributes. This may allow existing seller integration processes to continue to operate without requiring significant modification or reintegration with the improved item catalog.

Similarly, the semantics in the feed metadata modeling the new product categories, attributes, and/or features may be utilized to support supplemental feeds from sellers with item details to support the new features and capabilities in the item catalog. This may allow sellers to benefit from the new enhancements and improvements of the item catalog while leaving existing integration processes intact. The metadata driven feed processing system also provides additional flexibility in supporting multiple types of seller-facing data entities and feed formats through metadata mapping. For example, the feed metadata may contain semantics that allow mapping of customer-facing product categories and attributes in the item catalog to data entities from the feed formats for a competing online marketplace, or for legacy inventory management or merchant applications.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
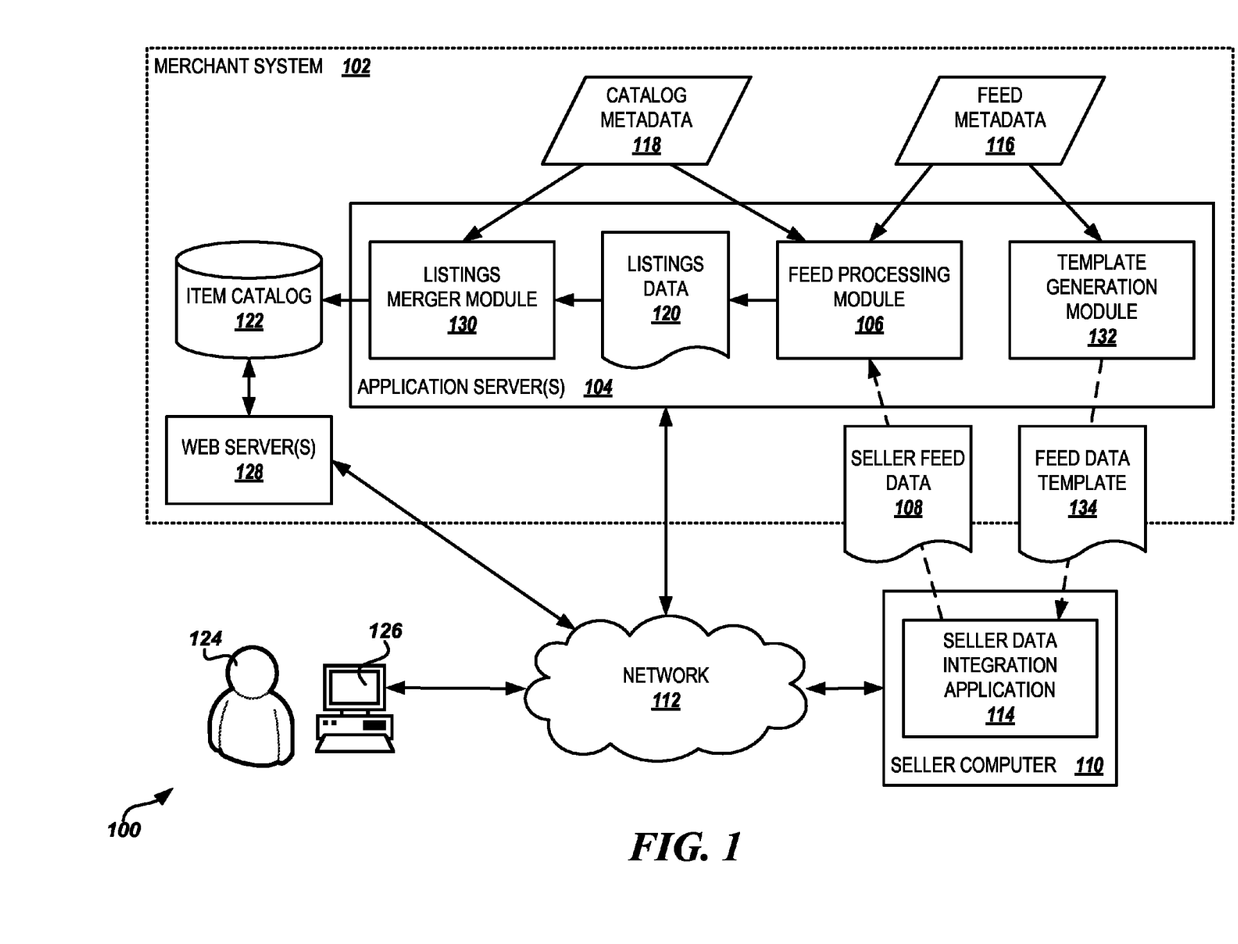
FIG. 1 is a system diagram showing aspects of an illustrative operating environment for a metadata-driven merchant feed processing system, including several software and hardware components provided by embodiments presented herein.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing a metadata-driven merchant feed processing system, according to embodiments provided herein. The environment 100 includes a merchant system 102 that implements the online marketplace. The merchant system 102 includes a number of application servers 104 that provide various application services to sellers and customers engaged in commerce through the online marketplace. The application servers 104 may represent standard server computers, database servers, Web servers, network appliances, desktop computers, other computing devices, and any combination thereof. The application servers 104 may execute a number of modules in order to provide the online marketplace services. The modules may execute on a single application server 104 or in parallel across multiple application servers in the merchant system 102. In addition, each module may consist of a number of subcomponents executing on different application servers 104 or other computing devices in the merchant system 102. The modules may be implemented as software, hardware, or any combination of the two.

According to embodiments, a feed processing module 106 executes on the application servers 104. The feed processing module 106 receives seller feed data 108 from sellers containing item details describing the items the seller wishes to make available for sale through the online marketplace. The seller feed data 108 may further contain header information that drives the processing of the feed, as will be described below. The seller feed data 108 may be a flat file containing tabular data, an XML file, or any other data container in which the items details can be encapsulated. As will be described in more detail herein, the seller feed data 108 may consist of multiple item listings, each containing a number of fields identifying the item and describing various attributes of the item. The feed processing module 106 may receive the seller feed data 108 from a seller computer 110 over a network 112. The network may be a local area network ("LAN"), a wide-area network ("WAN"), the Internet, or any other networking topology known in the art that connects the seller computer 110 to the application servers 104 in the merchant system 102. In one embodiment, the seller feed data 108 may be produced by a seller data integration application 114 implemented on the seller computer 110. The seller data integration application 114 may be implemented by the seller to integrate data regarding the items from the seller's internal inventory management or merchant systems with the online marketplace through the feed processing module 106.

The feed processing module 106 uses a combination of feed metadata 116 and catalog metadata 118 to process the seller feed data 108 and produce listings data 120 regarding the seller's items that is in the proper format for inclusion of items in the online marketplace. As will be described in more detail below, the feed metadata 116 utilized by the feed processing module 106 models the seller-facing product categories, attributes, and value constraints contained in the seller feed data 108 in a declarative form. The catalog metadata 118 models the attributes and semantics of items as they exist in an item catalog 122. The item catalog 122 contains the details regarding the items listed by the sellers to be presented to customers 124 wishing to purchase the items. In one embodiment, the customers 124 may utilize user computing devices 126, such as personal computers ("PC"), desktop workstations, laptops, notebooks, personal digital assistants ("PDA"), wireless devices, electronic book readers, or other personal computing devices, to browse, search, and purchase the items in the item catalog 122 through a web server 128 or other presentation service provided by the merchant system 102.

While the feed metadata 116 and catalog metadata 118 are described herein and shown in the figures as being separate entities, it will be appreciated that the feed metadata and the catalog metadata may be provided by a single metadata service or repository in the merchant system 102. According to embodiments, the feed processing module 106 uses the combination of the feed metadata 116 and the catalog metadata 118 to normalize the seller feed data 108, validate the normalized data, and then transform the seller feed data to the listings data 120 for inclusion into the item catalog 122, as will be described in more detail below in regard to FIG. 2. Once the listings data 120 is produced from the seller feed data 108, a listings merger module 130 adds the details regarding the items described in the listings data to the item catalog 122. It will be appreciated that some of the item details described in the listings data 120 may result in new items being inserted into the item catalog 122, while other item details may simply update attributes of existing items in the item catalog.

The merchant system 102 may also include a template generation module 132. The template generation module 132 executes on the application servers 104 and utilizes the feed metadata 116 to generate a feed data template 134 for a seller, which the seller may then utilize in the generation of the seller feed data 108. The feed data template 134 may be a flat file, an XML file, or any other data container that the feed processing module 106 can process. In one embodiment, a seller wishing to list items through the online marketplace may utilize the template generation module 132 to generate a product category-specific feed data template 134 for the upload of the item details. The seller may select a product category at the desired granularity level from a list of product categories supported by the item catalog 122. For example, a seller wishing to sell kitchen items may select a product category of "Kitchen Products," while a seller wishing to sell multiple home items, such as kitchen, garden, and bedding products, may select a product category of higher granularity.

The template generation module 132 may generate a feed data template 134 for the selected product category based on the seller-facing data entities defined in the feed metadata 116 that correspond to the customer-facing attributes defined for the product category in the catalog metadata 118. For example, the feed data template 134 may produce a tab-delimited flat file having individual fields corresponding to each attribute defined in the feed metadata 116 and/or catalog metadata 118 for the selected product category. The feed data template 134 may further contain header information indicating the product category for which the template was generated, as well as a current version or "release package" of the catalog metadata 118 utilized in the generation of the template. As will be described below, the product category and release package in the header information may be utilized by the feed processing module 106 to select the correct semantics from the feed metadata 116 while processing seller feed data 108 created from the feed data template 134. The feed data template 134 may contain other header information, such as an identity of the seller, a marketplace, a seller priority or tier, and the like, depending on the seller requesting the template generation. These additional header values may further be utilized by the feed processing module 106 to select the correct semantics and drive processing of the associated seller feed data 108, as will be described in more detail herein.

A seller may implement a seller data integration application 114 around the generated feed data template 134 for ongoing upload of item details for the seller's items. As described above, the seller data integration application 114 may integrate data regarding the items from the seller's internal inventory management or merchant systems with the seller-facing entities defined in the feed data template 134 to produce the seller feed data 108. The seller feed data 108 may contain the header information from the corresponding feed data template 134, including the indication of the product category for the items and the version of the item catalog or release package for which the template was generated. The seller is said to be "integrated" with that particular release package. The seller data integration application 114 may be implemented in an automated fashion such that the seller feed data 108 is updated from the seller's internal systems on a periodic basis and transmitted to the feed processing module 106 for incorporation of the updated item details in the item catalog 122.

As described above, the feed metadata 116 contains the semantics for the seller-facing entities described in the seller feed data 108 based on a time dimension (release package/version), a product category dimension, and/or other dimensions. The time dimension allows the feed metadata 116 to capture the differences between different release packages by maintaining the semantics of the attributes as of a certain version of the item catalog 122. For example, an attribute may be added for items belonging to an "Apparel" product category in the item catalog 122 in release package 1.9 that indicates whether the items are wrinkle-free. Further, semantics in the feed metadata 116 introduced with the "wrinkle_free" attribute in release package 1.9 may stipulate that a value for the attribute must be specified for all apparel items in seller feed data 108 conforming to the current release package, but that a default value based on a manufacturer attribute for the items and/or seller preferences should be generated for feeds conforming to older release packages.

The product category dimension in the feed metadata 116 may allow the feed processing system to more easily handle expansion of the product categories in the item catalog 122. For example, a seller integrated with release package 3.8 of the online marketplace may submit items under the product category of "AlcoholicBeverage" and specify a value for a "beverage_type" attribute for each item in the category. The merchant may subsequently expand the product categories in the item catalog 122 in release package 4.0 to include new categories for each of the separate types of alcoholic beverage. In conjunction with the new product categories and attributes of release package 4.0, the semantics in the feed metadata 116 associated with the "AlcoholicBeverage" product category may be modified such that the value of the "beverage_type" attribute specified for these items drives to which of the new product categories the item will be assigned in seller feed data 108 conforming with release package 3.8.

Other dimensions may exist in the feed metadata 116 that provide similar functionality. For example, a marketplace dimension in the feed metadata 116 may allow different semantics to be specified for the processing of items in the same product categories and/or release packages but being made available in different geographical regions. This may be necessary if different information is required to be provided to potential customers 124 for these items based on local rules and regulations in the various regions, for example. The semantics in the feed metadata 116 specified for the different marketplaces may provide different validation functionality as well as different transformation of the seller-facing product categories and attributes provided in the seller feed data 108 to the customer-facing entities of the item catalog 122. Other dimensions may be imagined by one skilled in the art that would further support different semantics in the feed metadata 116 for processing items in the same product categories and/or release packages, such as an identification of the seller, a priority or tier associated with the seller, and the like. It is intended that this application include all such dimensions of the feed metadata 116.

Figure 2:
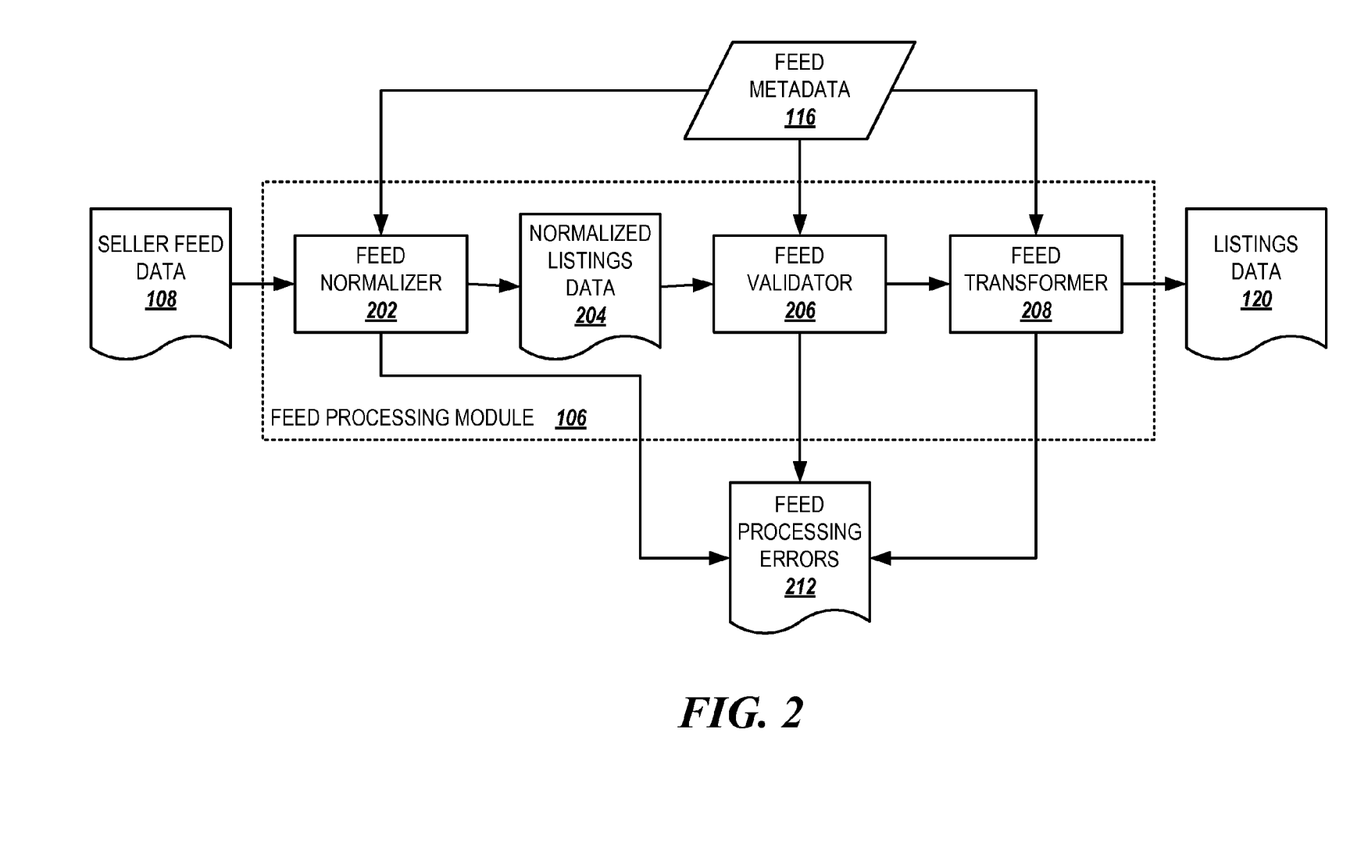
FIG. 2 is a block diagram showing further details of a feed processing module, according to embodiments presented herein.

FIG. 2 shows further details of the feed processing module 106, according to one embodiment. The feed processing module 106 may include a feed normalizer 202 component, a feed validator 206 component, and a feed transformer 208 component. Each of these components may utilize the feed metadata 116 to perform the corresponding normalization, validation, and transformation functions. The feed normalizer 202 accepts the seller feed data 108 in one of the supported formats, such as a tab-delimited flat file or an XML file, and normalizes the item listings contained therein to produce normalized listings data 204. The normalized listings data 204 contains the item listings from the seller feed data 108 in a basic form that can be consumed by the remaining components. Each item listing in the normalized listings data 204 may be identified by item identification information, such as a SKU, and a target product category.

The remaining attributes in the item listing may be arranged into name-value pairs. The feed normalizer 202 consults the feed metadata 116 to identify the seller-facing item attributes by their different forms or position in the seller feed data 108, based on the corresponding product category and the release package, for example. The feed normalizer 202 also normalizes the attribute names, when necessary. For example, an attribute, such as "ProductName," may be named differently in different data feeds, depending on the feed data template 134 utilized in producing the feed. The attributes names must be reconciled and associated with an appropriate attribute in the item catalog 122 before the normalized listings data 204 can be validated. A reverse mapping may be maintained for the normalized attribute names so that any errors involving processing of the seller feed data 108 can be reported back to the seller using the seller-facing names.

The feed validator 206 accepts the normalized listings data 204 generated by the feed normalizer 202 and validates it for correctness. The validations performed on the normalized listings data 204 may include data type checks on the attribute values and application of constraints involving enumerations, length and value restrictions, cardinality checks, and the like. The feed validator 206 may utilize the feed metadata 116 to derive the data type and constraint information for each attribute referenced in the normalized listings data 204, based on the values for the dimensions specified in the header information of the seller feed data 108, for example.

The declarative statements in the feed metadata 116 may identify the fields appearing in the seller feed data 108 and associate them with the entities defined in the catalog metadata 118, thereby inheriting the default semantics for validation. For example, the fields "item_length," "item_length_unit_of_measure," "item_width," and "item_width_unit_of_measure" contained in the seller feed data 108 may identify the dimensions of an item described in the feed. The feed metadata 116 may collectively map these fields to a composite "item_display_dimensions" attribute in the item catalog 122, having a data type of "DisplayDimensions," as defined by the catalog metadata 118. By virtue of such mappings, the feed validator 206 may validate the attributes in the seller feed data 108 using the data types and constraints defined in the catalog metadata 118 for the "DisplayDimensions" data type. In one embodiment, the feed metadata 116 may provide semantics for cross-field or cross-attribute validation of fields in the seller feed data 108. For example, semantics in the feed metadata 116 may define a restriction requiring that, if a value is specified for any of the "item_length," "item_width," and "item_height" fields in the seller feed data 108, then values must be specified for all the fields.

In situations where the semantics for a seller-facing entity diverge from those of the entities in the item catalog 122, the feed metadata 116 may override the semantics in the catalog metadata 118. For example, the semantics for a "Consumer Electronics" product category may stipulate that the values for the "product_subcategory" attribute, declared as a string in the catalog metadata 116, must be from an enumeration. For this purpose, the feed metadata 116 may define a constraint on the "product_subcategory" attribute that is enforced only when the product category of an item listing is known to be "Consumer Electronics." The feed validator 206 may utilize a combination of constraints defined in the catalog metadata 118 and the feed metadata 116 to validate the fields described in the seller feed data 108.

According to one embodiment, the feed validator 206 has native support for validating scalar data (strings, numbers, dates, and timestamps) and enforcing constraints on such data. The data type declarations inherited from the catalog metadata 118 and/or overridden by the feed metadata 116 may be mapped to one of these scalar types for validating the item listings from the seller feed data 108. Any errors detected by the feed validator 206 may be collected in a feed processing errors 212 file. The error messages in the feed processing errors 212 may be mapped to the original seller-facing field names specified in the seller feed data 108 so that the feed processing errors are more easily interpreted when returned to the seller computer 110.

In one embodiment, the customer-facing product category for the items described in the seller feed data 108 may not match the seller-facing product category specified in the header information. Instead, the feed validator 206 may interact with the feed metadata 116 to identify one or more fields in the seller feed data 108 that help identify the target customer-facing product category for each item listing. These fields are treated as "anchors" for the purpose of validation and they may vary from one product category to the next. For example, in the case of the "AlcoholicBeverage" product category described above as associated with release package 3.8, the value of the "beverage_type" attribute specified for these items may be used to identify the target customer-facing product type added in release package 4.0. With the use of context-specific metadata statements, the feed validator 206 may identify the fields representing anchors for any given feed and iterates over each item listing contained therein.

For each item listing in the seller feed data 108, the values assigned to the anchor fields may be used to determine the target customer-facing product category using a static mapping, for example. Once the target product category is determined, the semantics for the specific product category are loaded and the attributes of the item listing are validated accordingly. It will be appreciated that, since each item listing in the seller feed data 108 could belong to a different target product category, the validations carried out by the feed validator 206 for each item listing in the feed may vary.

The feed transformer 208 transforms the normalized listings data 204 that has undergone validation into the listings data 120 that is in a format for inclusion in the item catalog 122. The feed metadata 116 provides the target mapping between each seller-facing field and the corresponding customer-facing attribute. Fields used in the seller feed data 108 may be product category and/or marketplace specific, but may map to a common set of attributes in the item catalog 122. The feed metadata 116 may provide the ability to declare the product category and marketplace specific fields as aliases to the customer-facing attributes. The feed metadata 116 may also allow limited forms of contextual value generation, substitution, and other transformations while mapping the fields from the seller feed data 108 to the appropriate item attributes in the item catalog 122.

In another embodiment, the mappings in the feed metadata 116 can be used to support new seller feed data formats beyond the flat-file and XML templates generated by the template generation module 132. For example, a seller on a competing online marketplace platform may have item listings in a format that cannot be readily accepted by the merchant's feed processing system. To enable such sellers to offer their items through the merchant's online marketplace, the feed metadata 116 may be extended to capture the semantics of the competing platform's feed formats, so that the corresponding item listings can be interpreted and mapped to customer-facing product categories and attributes in the item catalog 122. Similarly, the feed metadata 116 can be extended with mappings for data entities from the seller's internal inventory management and merchant applications.

The merchant system 102 may provide a self-service metadata mapping tool that allows a seller to plug-in their listings format, analyze and compare their listings format with that of the item catalog 122, and map the fields, attributes, and other data entities of the internal listings format to corresponding attributes of the item catalog. The mappings may then be stored in the feed metadata 116 for the seller. The mappings established through the metadata mapping tool may range from simple renaming of columns and enumerations, such as "in." being the same as "inches," to complex data extractions where a composed value is split and assigned to multiple attributes in the item catalog 122. For example, a single product dimension field in the seller's system formatted as a string, such as "17×16.3 x 3.3 inches," may be interpreted and mapped to six different attributes in the item catalog 122, such as "length," "length_unit," "width," "width_unit," "height," and "height_unit." Such a mapping may be stored in the feed metadata 116 with metadata statements for pattern extraction operations, such as regular expressions.

For commonly used mapping constructs, the metadata mapping tool may provide higher-level abstractions that can be reused by many sellers. For example, the product dimensions mapping discussed above may be pre-defined in a "toolbox" so that a seller wishing to implement such a mapping may select it and then customize it for the seller's use. The toolbox with higher-level abstractions for mappings contained in the feed metadata 116 may continually evolve from the contributions of sellers and analysis of the common mappings defined by sellers. For example, based on the analysis of the mappings defined by multiple sellers of "Gourmet" product types, it may be determined that a common set of mappings in the feed metadata 116 may be used to extract the nutritional facts from a composed value. Such mappings may be appropriately labeled and included in the toolbox for other sellers to utilize.

The ability to share the metadata mappings in the feed metadata 116 across multiple sellers may further allow a seller utilizing a standard format for listings data to make use of pre-defined mappings for the listing format in order to integrate seller feeds. For example, a seller integrated with a competing selling platform may use the metadata mapping tool to identify a pre-defined set of mappings for the platform, and then customize it for the seller's use. Similarly, metadata mappings may be defined for commercial inventory management applications systems, such as the QUICKBOOKS® software suite from Intuit, Inc. of Mountain View, Calif., allowing fast and efficient integration of sellers utilizing these applications.

The metadata-driven merchant feed processing system may also support processing of canonical XML feeds. A canonical XML feed allows items of all product categories to be described in a single, normalized XML format. In one embodiment, the canonical XML feed may follow the Resource Description Framework ("RDF") style, with each item included in the feed considered to be a resource that is described using a set of properties (attributes), such as "Item Weight," "Brand," "Color," and the like. The canonical XML feed may contain an XML element for each item listing that identifies the item by its SKU and describes all of the item's properties in nested XML elements, with names matching those of the item attributes. Listings data in a canonical XML feed may be validated using semantics in the feed metadata 116, since there may be no XML schema for validating the feeds. The benefits of canonical XML feeds may be extended to schema-based product XML feeds by allowing open content, using "xsd:any" constructs in the corresponding schema definitions. The open content from such feeds can be validated using the feed metadata 116 while the rest of the structured content is processed by an XML schema validator.

In one embodiment, the metadata-driven merchant feed processing system further supports supplemental feeds. A supplemental feed may allow a seller to upload partial information about their items that will be combined with the listings data 120 processed from the existing seller feed data 108 to create more complete item descriptions in the item catalog 122. This may allow sellers to benefit from new enhancements and improvements made by the merchant to the item catalog 122 while leaving existing integration processes intact. For example, a seller of wine may be integrated with release package 3.8 of the item catalog 122. Seller feed data 108 received from the seller may specify that the seller's items belong to the product category "AlcoholicBeverages" and have a value of "wine" for the "beverage_type" attribute. The merchant may subsequently expand the product categories in the item catalog 122 in release package 4.0 to include new categories for each of the separate types of alcoholic beverage, including "Wine." In addition, the merchant may add the additional attributes of "bottle_aging_time" and "grape_variety" to the new "Wine" product category.

While semantics added to the feed metadata 116 in conjunction with the new product categories and attributes of release package 4.0 may allow the seller's items to be properly mapped to the new "Wine" product category, as described above in regard to FIG. 2, no default values for the "bottle_aging_time" or "grape_variety" attributes may be available. This may prevent the seller's wines from appearing in the list of sellers for items located in the item catalog 122 by customers 124 searching for these attributes. In addition, the seller's current integration process may support frequent updates of dynamic attributes for the seller's items, such as price and availability, and the cost to the seller of reintegration with the new release package 4.0 may be prohibitively expensive. Instead, the seller may provide a supplemental feed that allows values for the new "bottle_aging_time" and "grape_variety" attributes for the seller's items to be merged into the item catalog 122 with the attributes for the items supplied from the listings data 120 produced by the existing integration process.

Specific attributes defined in the feed metadata 116 for seller-facing entities may be grouped into virtual sets that can be used in a supplemental feed. The virtual sets may be defined by a specific feature or enhancement to the item catalog 122. For example, the "bottle_aging_time" and "grape_variety" may be grouped by a "Wine Store" enhancement. In another example, a "Promotional Pricing" feature may be added that allows a seller to provide a discount for orders totaling over a particular value. This feature may require values for the attributes "pricing_discount" and "promotional_order_total" that are grouped under the defined "Promotional Pricing" feature. The seller may target one or more of these features or enhancements with a supplemental feed.

Figure 3:
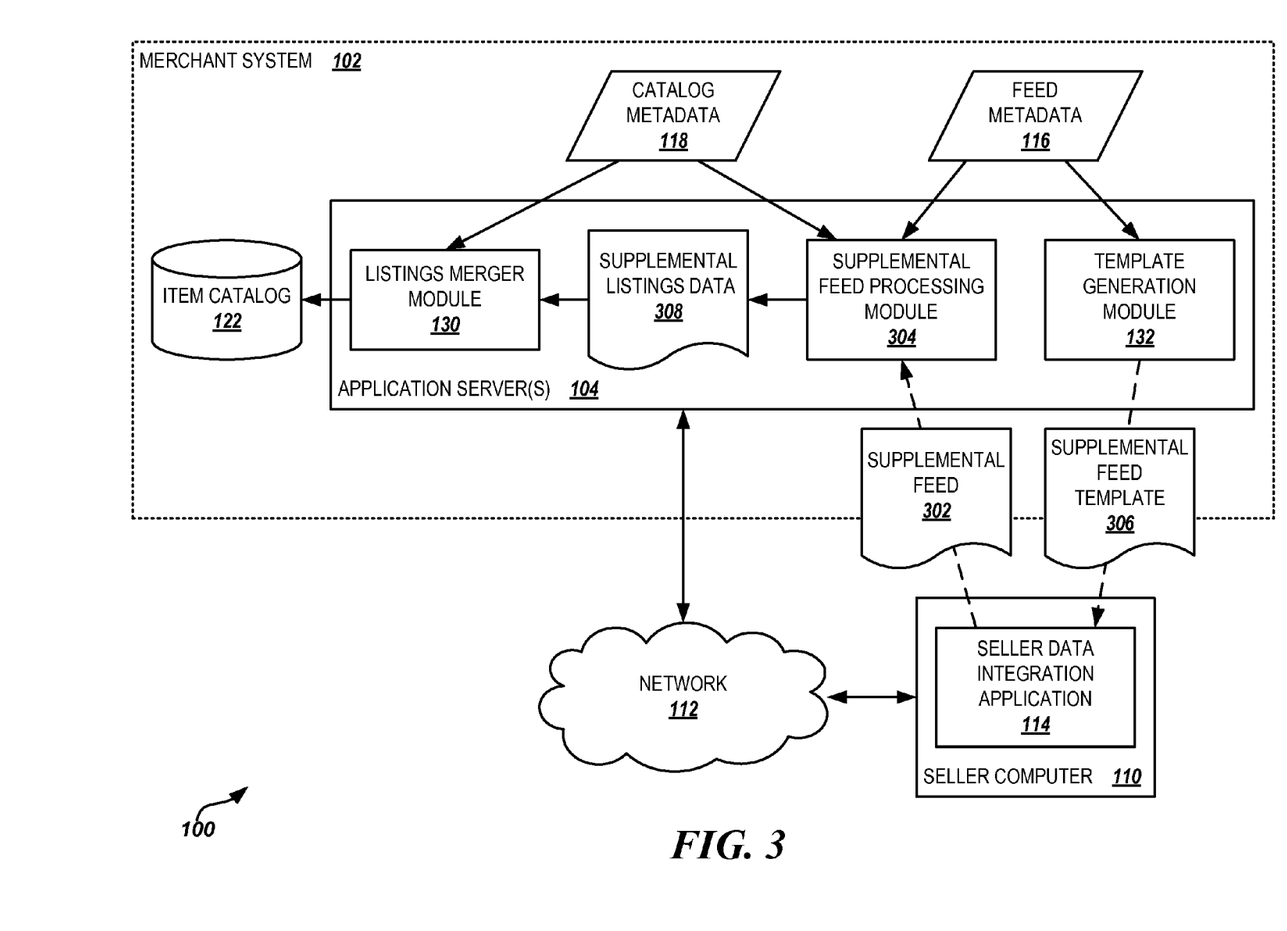
FIG. 3 is a system diagram showing further aspects of an illustrative operating environment for the metadata-driven merchant feed processing system, including components for processing supplemental feed data, according to embodiments presented herein.

FIG. 3 shows additional components of the illustrative operating environment 100 for the processing of supplemental feeds from a seller, according to embodiments. The seller computer 110 may transmit a supplemental feed 302 to the merchant system 102 over the network 112, where it is received by a supplemental feed processing module 304 executing on the application servers 104. Like the seller feed data 108, the supplemental feed 302 may be a flat file containing tabular data, an XML file, or any other data container in which the supplemental information can be encapsulated. Unlike the product category-specific seller feed data 108 described above, however, a supplemental feed 302 may have no specific structure. The supplemental feed processing module 304 converts the data in the supplemental feed 302 to triples, consisting of an item SKU, an attribute name, and an attribute value, for further processing. The supplemental feed 302, therefore, may be in any format that can be normalized by the supplemental feed processing module 304 into the triple format.

In one embodiment, the seller may utilize the template generation module 132 provided by the merchant system to generate a supplemental feed template 306 in the desired format. For example, the seller may select a spreadsheet format and one or more target features from a list of features compatible with the release package of the seller's current integration, as defined by the feed metadata 116. Based on the selection, the template generation module 132 may generate a supplemental feed template 306 consisting of a spreadsheet file containing a column to identify each item, such as an item SKU column, and additional columns for the attributes grouped with the selected features. The seller may then utilize the supplemental feed template 306 to create the supplemental feed 302 for submission to the supplemental feed processing module 304.

After converting the data in the supplemental feed 302 to triples, the supplemental feed processing module 304 validates the triples using the semantics in the feed metadata 116 and catalog metadata 118. In one embodiment, each feature identified in the feed metadata 116 is associated with the set of attributes, their data types and value constraints, and the corresponding seller-facing fields used in the supplemental feeds 302. The feature or features targeted by the supplemental feed may be specified in header information or other control information submitted with the feed data. The supplemental feed processing module 304 consults the feed metadata 116 to identify the attributes, data types, and value constraints for the targeted features and validates the attribute values for each item to ensure that the necessary information for the targeted feature is complete and valid. The validated data from the supplemental feed 302 is then submitted to the listings merger module 130 for a partial update operation of the item catalog 122.

According to one embodiment, the information submitted in a supplemental feed 302 is configured to outlive the listings data 120 produced by the feed processing module 106 as part of the seller's integration process described above. The validated triples from the supplemental feed 302 may be saved as supplemental listings data 308 in a supplemental feed repository, for example. Each time the listings merger module 130 receives listings data 120 intended to fully update or purge and replace the seller's items in the item catalog 122, the listings merger module 130 will include the information from the supplemental listings data 308 with the listings data being added to the item catalog. In this way, a seller may submit a supplemental feed 302 to support a particular feature once, while leaving the periodic updates of the seller's existing integration process intact.

In situations where the same attribute is included in the listings data 120 and the supplemental listings data 308, the values from the supplemental listings data 308 take precedence and will override the values specified in the original listings data, according to one embodiment. In another embodiment, multiple supplemental listings data 308 corresponding to separate supplemental feeds 302 submitted by the same seller are merged such that any conflicts in the attribute values associated with the same SKU are rejected at the time of supplemental feed validation.

In a further embodiment, the supplemental feed processing module 304 may process supplemental feeds 302 consisting of declarative rules that generate supplemental listings data 308 based on seller preferences, default values, item descriptions, or other existing item attributes. For example, an apparel seller may specify that values for an "is_wrinkle_resistant" attribute for items in a "Shirts" product category should be based on the value of a corresponding "manufacturer" attribute. In another example, a seller may specify a single value for a "bottle_aging_time" attribute for all of the seller's items in the "Wine" product category.

The rules specified in the supplemental feed 302 may use restricted metadata and syntax so that they can be efficiently evaluated by the supplemental feed processing module 304. It will be appreciated that the seller may provide the declarative rules to the merchant system 102 through a component other than the supplemental feed processing module 304. For example, a seller may utilize a Web-based user interface to a rule processing engine to specify the declarative rules. The rule processing engine may then provide simulated supplemental feed data to the supplemental feed processing module 304 based on the specified rules and existing data in the item catalog 122 and or listings data 120 for the seller's items.

Figure 4:
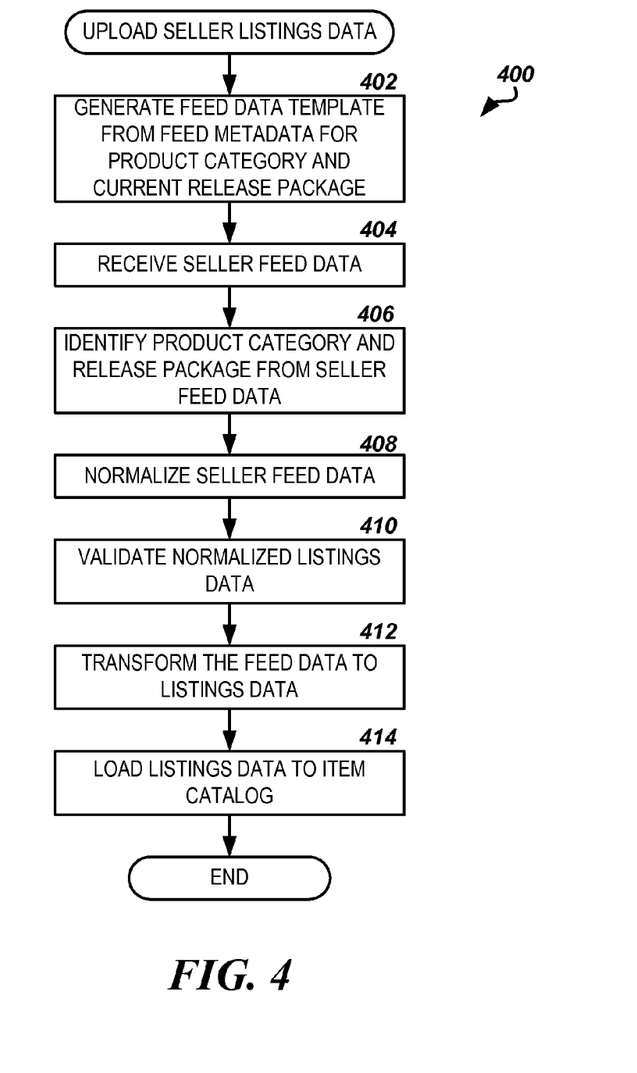
FIG. 4 is a flow diagram showing one method for uploading item details regarding a seller's items for listing in an online marketplace, according to embodiments described herein.
Figure 5:
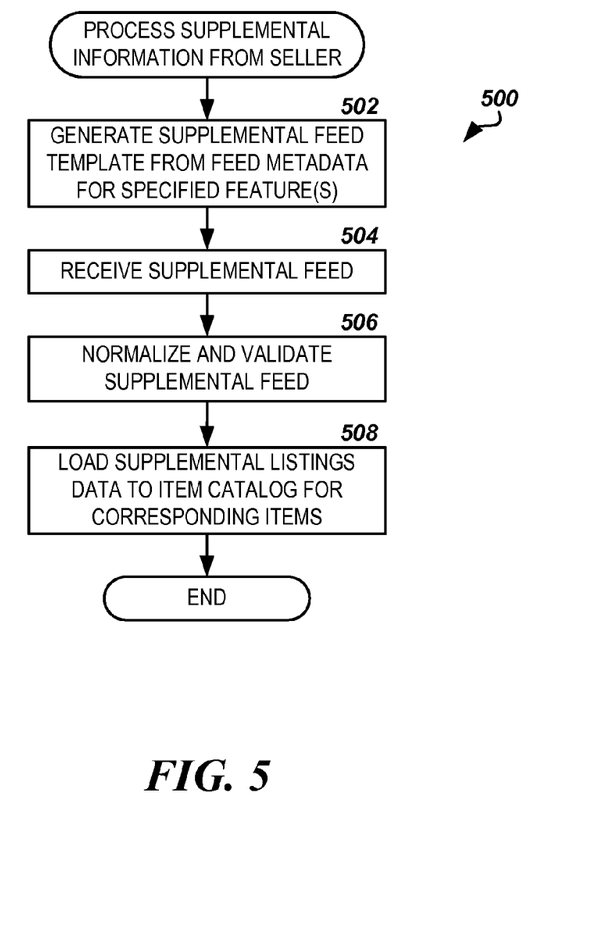
FIG. 5 is a flow diagram showing one method for processing supplemental information for a seller's listings in the online marketplace, according to embodiments described herein.

Turning now to FIGS. 4 and 5, additional details will be provided regarding the embodiments presented herein for a metadata-driven merchant feed processing system. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for uploading item details regarding a seller's items to the merchant system 102 for listing in the online marketplace, according to one embodiment described herein. The routine 400 may be performed by the template generation module 132, the feed processing module 106, and the listings merger module 130, as described above in regard to FIG. 1. It will be appreciated that the routine 400 may also be performed by other modules or components executing on the application servers 104 in the merchant system 102, or by any other combination of modules and components.

The routine 400 begins at operation 402, where the template generation module 132 generates a feed data template 134 for the seller, based on the seller's selection of a file format and a product category for the seller's items. For example, the seller may specify that a spreadsheet-based template should be generated for the items in the "Kitchen Products" product category. The template generation module 132 may then generate a feed data template 134 consisting of a spreadsheet file containing a column to identify each item, such as an item SKU, and additional columns for the seller-facing attributes for the "Kitchen Products" product category as defined in the feed metadata 116 and/or the catalog metadata 118. The feed data template 134 may further contain header information identifying the "Kitchen Products" product category as well as the current version or release package for the item catalog 122.

As described above in regard to FIG. 1, the seller may then utilize the generated feed data template 134 to implement the seller data integration application 114 for ongoing upload of item details for the seller's items, according to one embodiment. The seller data integration application 114 may integrate data regarding the items from the seller's internal inventory management or merchant systems with the seller-facing attributes defined in the feed data template 134 to produce seller feed data 108. The seller feed data 108 may also contain the header information from the feed data template 134. The seller data integration application 114 may be implemented in an automated fashion such that the seller feed data 108 is updated from the seller's internal systems on a periodic basis and uploaded to the feed processing module 106 for incorporation of the updated item details in the item catalog 122.

From operation 402, the routine 400 proceeds to operation 404, where the feed processing module 106 receives the seller feed data 108 over the network 112, as further described above in regard to FIG. 1. Next, at operation 406, the feed processing module 106 identifies the product category and release package associated with the seller feed data 108. As described above, this may be determined from the header information or other control information supplied with the seller feed data 108 file. In one embodiment, the seller feed data 108 may contain details regarding items for multiple product categories. The feed processing module 106 may utilize one or more fields from each item listing in the seller feed data 108 to determine the seller-facing product category associated with each item. This process may be driven by semantics in the feed metadata 116, for example.

The routine 400 then proceeds from operation 406 to operation 408, where the feed normalizer 202 component of the feed processing module 106 normalizes the seller feed data prior to validation and further processing, as described above in regard to FIG. 2. The feed normalizer 202 may convert each item listing in the seller feed data 108 from the supplied format to a normalized listing, identified by item identification information, such as an item SKU, and a target product category derived from the header information of the seller feed data or from the item listing itself. The remaining fields in the item listing may be arranged into name-value pairs, based on the feed metadata 116 describing the item attributes for the corresponding seller-facing product category and the release package. The feed normalizer 202 may also normalize the attribute names, if necessary, as further described above.

From operation 408, the routine 400 proceeds to operation 410, where the feed validator 206 component of the feed processing module 106 validates each item listing in the normalized listings data 204 based on the semantics for the seller-facing product categories, their attributes, and any value constraints maintained in the feed metadata 116 and/or catalog metadata 118, as further described above in regard to FIG. 2. The validations performed on the normalized listings data 204 may include data type checks on the attribute values and application of constraints involving enumerations, length and value restrictions, cardinality checks, and the like. In one embodiment, the validations carried out by the feed validator 206 are preliminary in nature, and the validator component does not duplicate validations that may take place further in the process, such as those performed by the listings merger module 130, for example.

The routine 400 proceeds from operation 410 to operation 412, where the feed transformer 208 component of the feed processing module 106 transforms the validated normalized listings data 204 into the listings data 120 based on mappings between each seller-facing field and the corresponding customer-facing attribute maintained in the feed metadata 116. As further described above, the feed metadata 116 may provide for limited forms of contextual value generation, substitution, and other transformations while mapping the fields from the seller feed data 108 to the appropriate item attributes in the item catalog 122.

From operation 412, the routine 400 proceeds to operation 414, where the listings merger module 130 adds the item attributes in the listings data 120 to the item catalog 122, as described above in regard to FIG. 1. According to embodiments, the listings merger module 130 may first check the supplemental feed repository in order to determine if any supplemental listings data 308 from the seller will override or supplement the attribute values from the listings data 120 before adding the listings to the item catalog 122. From operation 414, the routine 400 ends.

FIG. 5 illustrates a routine 500 for processing supplemental information from a seller regarding the seller's listings in the online marketplace, according to one embodiment described herein. The routine 500 may be performed by the template generation module 132, the supplemental feed processing module 304, and the listings merger module 130, as described above in regard to FIG. 3. It will be appreciated that the routine 500 may also be performed by other modules or components executing on the application servers 104 in the merchant system 102, or by any other combination of modules and components.

The routine 500 begins at operation 502, where the template generation module 132 generates a supplemental feed template 306 for the seller, based on the seller's selection of a file format and one or more target features defined in the feed metadata 116 as compatible with the seller's release package. For example, the seller may specify that a spreadsheet-based template should be generated targeting a "Promotional Pricing" feature. The template generation module 132 may then generate a supplemental feed template 306 consisting of a spreadsheet file containing a column to identify each item, such as an item SKU column, and additional columns for the seller-facing fields corresponding to the "pricing_discount" and "promotional_order_total" attributes grouped under the defined "Promotional Pricing" feature in the feed metadata 116. The supplemental feed template 306 may further contain header information or other control information identifying the "Promotional Pricing" feature as the target feature for the supplemental feed.

As described above in regard to FIG. 3, the seller may then utilize the generated supplemental feed template 306 to create a supplemental feed 302 containing an item SKU and values for the "pricing_discount" and "promotional_order_total" attributes for each item to be updated in the item catalog 122. The seller may transmit the supplemental feed 302 to the merchant system over the network 112. From operation 502, the routine 500 proceeds to operation 504, where the supplemental feed processing module 304 receives the supplemental feed 302 from the seller computer 110 over the network 112, as further described above in regard to FIG. 3. Next, at operation 506, the supplemental feed processing module 304 normalizes the data in the supplemental feed 302 and then validates the normalized data.

The supplemental feed processing module 304 validates the normalized data based on the semantics in the feed metadata 116 and catalog metadata 118 defined for the target feature(s) indicated by the header information or other control information submitted with the supplemental feed 302. According to one embodiment, the normalized and validated supplemental feed 302 is saved as supplemental listings data 308 in a supplemental feed repository. The routine 500 then proceeds from operation 506 to operation 508, where the listings merger module 130 includes the information from the supplemental listings data 308 with the corresponding listings in the item catalog 122. From operation 508, the routine 500 ends.

Figure 6:
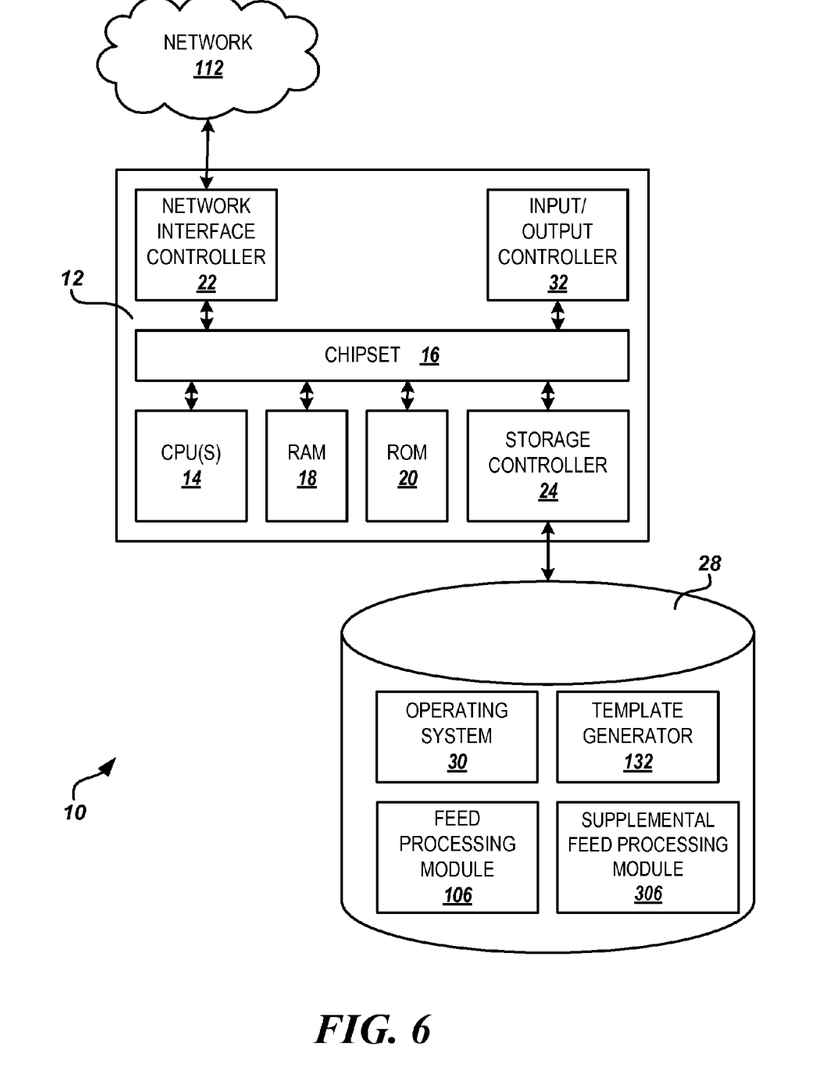
FIG. 6 is a computer architecture diagram showing an illustrative computer hardware architecture for computing devices described in embodiments presented herein.

FIG. 6 shows an example computer architecture 10 for a computer 12 capable of executing the software components of the metadata-driven merchant feed processing system, as presented above. The computer architecture 10 shown in FIG. 6 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104, seller computer 110, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 112, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. The NIC 22 is capable of connecting the computer 12 to other computing devices over the network 112, such as other application servers 104, the seller computer 110, the user computing device 126, a data storage system in the merchant system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage medium to store and retrieve information, such as program modules, data structures, or other data. It should be appreciated by those skilled in the art that computer-readable storage media can be any available non-transitory media that may be accessed by the computer 12. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the feed processing module 106, the template generation module 132, and the supplemental feed processing module 304, each of which was described above in regard to FIGS. 1 and 3. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 400 or 500 for the metadata-driven merchant feed processing system, as described above in regard to FIGS. 4 and 5.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computer 12 may not include all of the components shown in FIG. 6, may include other components that are not explicitly shown in FIG. 6, or may utilize an architecture completely different than that shown in FIG. 6.

Based on the foregoing, it should be appreciated that a metadata-driven merchant feed processing system is presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A method for processing feed data from sellers for inclusion of details regarding an item in an item catalog, the method comprising:

maintaining in a merchant system feed metadata comprising semantics describing a transformation of seller-facing feed data to customer-facing listings data, wherein the feed metadata comprises at least a first set of semantics describing the transformation of attributes of the item corresponding to a first version of the item catalog and a second set of semantics describing the transformation of the attributes of the item corresponding to a second version of the item catalog;

receiving, at one or more computers in the merchant system, a specification of a version of the item catalog and a product category;

generating, by the one or more computers, a template for items of the specified product category from the set of semantics in the feed metadata corresponding to the specified version of the item catalog, the template comprising header information indicating the specified version of the item catalog and the specified product category;

receiving, at the one or more computers, seller feed data from a seller comprising data describing attributes of the item to be included in the item catalog, wherein the seller feed data is created from the template and wherein the seller feed data comprises the header information indicating the specified version of the item catalog and the specified product category;

normalizing, by the one or more computers, the seller feed data based on the set of semantics in the feed metadata corresponding to the specified version of the item catalog and the specified product category;

validating, by the one or more computers, the data describing the attributes of the item based on the set of semantics in the feed metadata corresponding to the specified version of the item catalog and the specified product category; and transforming, by the one or more computers, the data describing the attributes of the item in the seller feed data to customer-facing listings data for the item for inclusion in the item catalog based on the set of semantics in the feed metadata corresponding to the specified version of the item catalog and the specified product category.

2. The method of claim 1, wherein validating the data describing the attributes of the item comprises validating that an attribute complies with one or more of a data type restriction, a data length restriction, a data value restriction, an enumeration of valid values for the attribute, or a cross-attribute restriction.

3. The method of claim 1, wherein the feed metadata further comprises a first set of semantics describing the transformation of an attribute of the item corresponding to a first marketplace and a second set of semantics describing the transformation of the attribute of the item corresponding to a second marketplace.

4. The method of claim 1, wherein transforming the data describing the attributes of the item comprises converting the value of an attribute from a first data type to a second data type.

5. The method of claim 1, wherein transforming the data describing the attributes of the item comprises computing multiple customer-facing attribute values from the data describing an attribute of the item in the seller feed data.

6. The method of claim 1, wherein the template comprises a flat file having rows corresponding to one or more distinct items and columns corresponding to one or more seller-facing attributes defined for items of the specified product category in the set of semantics of the feed metadata corresponding to the specified version of the item catalog.

7. The method of claim 1, wherein the template comprises XML schema describing semantics for one or more seller-facing attributes defined for items of the specified product category in the set of semantics of the feed metadata corresponding to the specified version of the item catalog.

8. A non-transitory computer-readable storage medium having computer-executable instructions stored thereon that, when executed by a computer, cause the computer to:

receive seller feed data from a seller comprising data describing attributes of an item for an online marketplace, the seller feed data indicating a version of an item catalog;

normalize the seller feed data based on feed metadata comprising semantics describing a transformation of seller-facing feed data to customer-facing listings data, wherein the feed metadata comprises at least a first set of semantics describing the transformation of the attributes of the item corresponding to the indicated version of the item catalog and a second set of semantics describing the transformation of the attributes of the item corresponding to a second version of the item catalog;

validate the normalized seller feed data based on validation rules contained in the first set of semantics in the feed metadata corresponding to the indicated version of the item catalog;

transform the data describing the attributes of the item in the normalized seller feed data to customer-facing listings data for the item based on the first set of semantics in the feed metadata corresponding to the indicated version of the item catalog; and load the customer-facing listings data into the item catalog for presentation to customers.

9. The computer-readable storage medium of claim 8, wherein the validation rules comprise one or more of a data type restriction, a data length restriction, a data value restriction, an enumeration of valid values for the attribute, or a cross-attribute restriction.

10. The computer-readable storage medium of claim 8, wherein the feed metadata further comprises a first set of semantics describing the transformation of an attribute of the item corresponding to a first marketplace and a second set of semantics describing the transformation of the attribute of the item corresponding to a second marketplace.

11. The computer-readable storage medium of claim 8, wherein transforming the data describing the attributes of the item comprises converting the value of an attribute from a first data type to a second data type.

12. The computer-readable storage medium of claim 8, wherein transforming the data describing the attributes of the item comprises computing multiple customer-facing attribute values from the data describing an attribute of the item in the seller feed data.

13. The computer-readable storage medium of claim 8, having further computer-executable instructions stored thereon that cause the computer to:

receive a specification of a version of the item catalog; and generate a template from the first set of semantics in the feed metadata corresponding to the specified version of the item catalog, the template comprising header information indicating the specified version of the item catalog, wherein the template is utilized to create the seller feed data.

14. The computer-readable storage medium of claim 8, wherein the seller feed data comprises data describing a plurality of items of different product categories.

15. A method for processing feed data from sellers for an online marketplace, the method comprising:

maintaining in a merchant system feed metadata comprising semantics describing a transformation of seller-facing feed data to customer-facing listings data, wherein the feed metadata includes a time dimension and a product category dimension, and wherein the feed metadata comprises a plurality of sets of semantics, each of the plurality of sets of semantics describing the transformation of attributes of an item corresponding to a time value and a product category;

receiving, at one or more computers in the merchant system, seller feed data from a seller comprising data describing attributes of the item for the online marketplace, the seller feed data indicating a time value and a product category;

transforming, by the one or more computers, the data describing the attributes of the item in the seller feed data to customer-facing listings data for the item based on the set of semantics in the feed metadata corresponding to the indicated time value and the indicated product category; and loading, by the one or more computers, the customer-facing listings data into an item catalog for presentation to customers.

16. The method of claim 15, wherein the semantics in the feed metadata further comprises validation rules for an attribute of the item and where the method further comprises validating the data describing the attribute of the item in the seller feed data based on the validation rules in the set of semantics corresponding to the indicated time value and the indicated product category.

17. The method of claim 16, wherein the validation rules comprise one or more of a data type restriction, a data length restriction, a data value restriction, an enumeration of valid values for the attribute, or a cross-attribute restriction.

18. The method of claim 16, wherein the feed metadata further comprises a marketplace dimension, and wherein the feed metadata further comprises a first set of semantics describing the transformation of an attribute of the item corresponding to a first marketplace value and a second set of semantics describing the transformation of the attribute of the item corresponding to a second marketplace value.

19. The method of claim 15, further comprising:
receiving, at the one or more computers, a specification of a time value and a product category; and
generating, by the one or more computers, a template from the set of semantics in the feed metadata corresponding to the specified time value and the specified product category, the template comprising header information indicating the specified time value and the specified product category, wherein the template is utilized to create the seller feed data.

20. The method of claim 19, wherein the template comprises a flat file having rows corresponding to one or more distinct items and columns corresponding to one or more seller-facing attributes defined for items of the specified product category in the set of semantics of the feed metadata corresponding to the specified time value.

21. The method of claim 19, wherein the template comprises XML schema describing semantics for one or more seller-facing attributes defined for items of the specified product category in the set of semantics of the feed metadata corresponding to the specified time value.

22. A metadata-driven merchant feed processing system comprising:
one or more application servers;
a metadata service providing feed metadata comprising semantics describing a transformation of seller-facing feed data to customer-facing listings data, wherein the feed metadata comprises a plurality of sets of semantics, each of the plurality of sets of semantics describing the transformation of attributes of an item corresponding to a specific version of an item catalog; and
a feed processing module executing on the one or more application servers, operatively connected to the metadata service, and configured to
receive seller feed data from a seller comprising data describing attributes of the item, the seller feed data indicating a version of the item catalog,
validate the data describing the attributes of the item in the seller feed data based on validation rules contained in the set of semantics in the feed metadata corresponding to the indicated version of the item catalog, and
transform the data describing the attributes of the item in the seller feed data to customer-facing listings data for inclusion in the item catalog based on the set of semantics in the feed metadata corresponding to the indicated version of the item catalog.

23. The system of claim 22, wherein the feed metadata further comprises a first set of semantics describing the transformation of an attribute for items belonging to a first product category and a second set of semantics describing the transformation of the attribute for items belonging to a second product category.

24. The system of claim 23, wherein the feed metadata further comprises a first set of semantics describing the transformation of an attribute of the item corresponding to a first marketplace and a second set of semantics describing the transformation of the attribute of the item corresponding to a second marketplace.

25. The system of claim 23, further comprising a template generator module executing on the one or more application servers, operatively connected to the metadata service, and configured to:
receive a specification of a version of the item catalog and a product category; and
generate a template from the set of semantics in the feed metadata corresponding to the specified version of the item catalog and the specified product category, the template comprising header information indicating the specified version of the item catalog and the specified product category, wherein the template is utilized to create the seller feed data.

26. The system of claim 25, wherein the template comprises a flat file having rows corresponding to one or more distinct items and columns corresponding to one or more seller-facing attributes defined for items belonging to the specified product category in the set of semantics of the feed metadata corresponding to the specified version of the item catalog.

27. The system of claim 25, wherein the template comprises XML schema describing semantics for one or more seller-facing attributes defined for items belonging to the specified product category in the set of semantics of the feed metadata corresponding to the specified version of the item catalog.

28. The system of claim 23, wherein the seller feed data comprises data describing a plurality of items belonging to different product categories.

29. The system of claim 22, wherein the semantics describing the transformation of seller-facing feed data to customer-facing listings data in the feed metadata comprise mappings of fields in the seller-facing feed data to attributes in the customer-facing listings data.

30. The system of claim 29, wherein the feed metadata contains a set of mappings corresponding to a listings format specific to a particular seller.

31. The system of claim 29, wherein the feed metadata contains a set of mappings corresponding to a listings format utilized by a plurality of sellers.

32. The system of claim 31, wherein the listings format utilized by the plurality of sellers corresponds to a commercial inventory management application.

* * * * *